United States Patent Office 3,313,843
Patented Apr. 11, 1967

3,313,843
PREPARATION OF CINNAMATE ESTERS
William J. Houlihan, Colonia, N.J., assignor to Universal Oil Products Company, Des Plaines, Ill., a corporation of Delaware
No Drawing. Filed Nov. 5, 1962, Ser. No. 235,912
13 Claims. (Cl. 260—473)

This invention relates to a process for preparing esters of aralkenyl aldehydes. More particularly, the invention is concerned with a process for preparing esters of cinnamic aldehyde in the presence of a peroxide catalyst.

Heretofore it has been found in the prior art that cinnamic acids may be prepared from cinnamic alcohols by utilizing a caustic medium, usually sodium hydroxide and water in the presence of a nickel peroxide catalyst. However, it has been difficult to oxidize cinnamic aldehydes to form cinnamic acids and obtain relatively good yields of a product which possesses a high purity. The oxidation of the cinnamic aldehyde cannot be performed in air to obtain these results. Furthermore, if a mild catalyst is used, the catalyst preferentially attacks the double bond instead of the carbonyl oxygen. However, it has now been discovered that esters of cinnamic aldehydes may be prepared directly from the aldehyde by treating the cinnamic aldehyde with an alcohol, preferably an aliphatic alcohol in the presence of a nickel peroxide catalyst in order to obtain the desired products comprising cinnamate esters. By utilizing the process of this invention it is possible to use a relatively small amount of the catalyst, usually up to one-half of the amount which may be required to prepare cinnamic acids from cinnamic alcohols. By utilizing the cinnamic aldehydes to directly form the esters thereof, it is possible to use starting materials which are relatively less expensive than the acid which would have to be prepared from cinnamic alcohol. Therefore, production of the desired cinnamate esters by using the process of this invention would be economically more attractive to operate and the final cost of the aforementioned esters would be lower. This is an important factor which would have some effect upon the decision of manufacturers of the end products into which these esters are used when deciding which method of preparation to follow. The cinnamate esters thus prepared will find a wide variety of uses in the chemical field, being used as intermediates in the preparation of aroma composition of matter or as intermediates in the preparation of some insecticidal composites.

It is therefore an object of this invention to provide a process for the preparation of cinnamate esters.

A further object of this invention is to provide a relatively inexpensive process for preparing cinnamate esters by utilizing low cost starting materials such as cinnamic aldehydes and aliphatic alcohols.

Taken in its broadest aspect, one embodiment of this invention resides in a process for the preparation of a cinnamate ester which comprises treating a cinnamic aldehyde with an alcohol in the presence of a nickel peroxide catalyst at reaction conditions, and recovering the desired ester.

A further object of this invention is found in a process for the preparation of a cinnamate ester which comprises treating a cinnamic aldehyde with an aliphatic alcohol in the presence of a nickel peroxide catalyst at a temperature in the range of from about 25° C. to about 100° C., and recovering the desired cinnamate ester.

Another embodiment of this invention is found in a process for the preparation of a cinnamate ester which comprises treating a cinnamic aldehyde with ethyl alcohol in the presence of a nickel peroxide catalyst at a temperature in the range of from about 25° C. to about 100° C., and recovering the desired cinnamate ester.

A specific embodiment of this invention is found in a process for the preparation of a cinnamate ester which comprises treating cinnamic aledhyde with methyl alcohol in the presence of a nickel peroxide catalyst at a temperature in the range of from about 25° C. to about 100° C., and recovering the desired methyl cinnamate.

Other objects and embodiments referring to alternative cinnamic aldehydes and alternative alcohols will be found in the following further detailed description of this invention.

As hereinbefore set forth, it has now been discovered that cinnamate esters may be prepared by treating a cinnamic aldehyde with an alcohol and preferably an aliphatic alcohol in the presence of a nickel peroxide catalyst to prepare the desired product. Examples of cinnamic aldehydes which may be utilized as starting materials according to the process of this invention possess the generic formula:

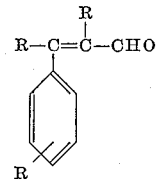

in which R is selected from the group consisting of hydrogen, alkyl, aryl, halo and alkoxy radicals. Specific examples of these aldehydes include cinnamic aldehyde, o-methoxycinnamic aldehyde, m-methoxycinnamic aldehyde, p-methoxycinnamic aldehyde, o-ethoxycinnamic aldehyde, m-ethoxycinnamic aldehyde, p-ethoxycinnamic aldehyde, o-propoxycinnamic aldehyde, m-propoxycinnamic aldehyde, p-propoxycinnamic aldehyde, o-methylcinnamic aldehyde, m-methylcinnamic aldehyde, p-methylcinnamic aldehyde, o-ethylcinnamic aldehyde, m-ethylcinnamic aldehyde, p-ethylcinnamic aldehyde, o-propylcinnamic aldehyde, m-propylcinnamic aldehyde, p-propylcinnamic aldehyde, o-isopropylcinnamic aldehyde, m-isopropylcinnamic aldehyde, p-isopropylcinnamic aldehyde, o-t-butylcinnamic aldehyde, m-t-butylcinnamic aldehyde, p-t-butylcinnamic aldehyde, o-phenolcinnamic aldehyde, m-phenolcinnamic aldehyde, p-phenolcinnamic aldehyde, o-chlorocinnamic aldehyde, m-chlorocinnamic aldehyde, p-chlorocinnamic aldehyde, o-bromocinnamic aldehyde, m-bromocinnamic aldehyde, p-bromocinnamic aldehyde, etc., α-methyl-o-methoxycinnamic aldehyde, α-methyl-m-methoxycinnamic aldehyde, α-methyl-p-methoxycinnamic aldehyde, α-ethyl-o-methoxycinnamic aldehyde, α-ethyl-m-methoxycinnamic aldehyde, α-ethyl-p-methoxycinnamic aldehyde, α-propyl-o-methoxycinnamic aldehyde, α-propyl-m-methoxycinnamic aldehyde, α-propyl-p-methoxycinnamic aldehyde, α-t-butyl-o-methoxycinnamic aldehyde, α-t-butyl-m-methoxycinnamic aldehyde, α-t-butyl-p-methoxycinnamic aldehyde, etc. It is to be understood that the aforementioned cinnamic aldehydes are only representatives of the type of cinnamic aldehydes which may be used and that the present invention is not necessarily limited thereto.

Examples of alcohols which may be used include aliphatic alcohols containing from 1 to about 3 carbon atoms such as methyl alcohol, ethyl alcohol, n-propyl alcohol, isopropyl alcohol, etc. The alcohol is present in the reaction mixture in a molar excess over the aldehyde and may also act as a solvent for the reaction mixture in addition to acting as an esterification agent.

The process of the present invention is effected at temperatures ranging from ambient (about 25° C.) up to about 100° C. or more. In the preferred embodiment of the invention the reaction is effected at atmospheric pressure. However, it is contemplated within the scope of this invention that super-atmospheric pressures ranging from about 2 to 50 atmospheres may be utilized if relatively high temperatures are used for the reaction, the amount of pressure being that which is sufficient to maintain a major portion of the reactants in the liquid phase. As hereinbefore set forth, the reaction is effected in the presence of a peroxide catalyst, the preferred catalyst comprising nickel peroxide although other peroxide catalysts may be used, although not necessarily with equivalent results.

The process of this invention may be effected in any suitable manner and may comprise either a batch or continuous type operation. For example, when a batch type operation is used, a quantity of the catalyst and cinnamic aldehydes is placed in a condensation apparatus provided with heating and stirring means. The alcohol is then added while the reaction is continuously stirred, meanwhile maintaining the temperature of the reaction mixture within a predetermined range. Following the completion of the reaction the flask and contents thereof are allowed to cool to room temperature, the reaction product is recovered and subjected to conventional means for separation from unreacted starting materials, unwanted side products, etc., and recovered.

It is also contemplated within the scope of this invention that the reaction may be effected in a continuous manner of operation, although not necessarily with equivalent results. When such a type of operation is used the starting materials comprising the cinnamic aldehyde and the alcohol are continuously charged to a reaction vessel which is maintained at the proper operating conditions of temperature and pressure. The reactor also contains the desired peroxide catalyst. Upon completion of the desired residence time the reactor effluent is continuously withdrawn, separated from unreacted starting materials, the latter being recycled to form a portion of the feed stock, and recovered by conventional means, such as fractional distillation.

Examples of cinnamate esters which may be prepared according to the process of this invention include methyl cinnamate, ethyl cinnamate, propyl cinnamate, isopropyl cinnamate, methyl-o-methylcinnamate, methyl-m-methylcinnamate, methyl-p-methylcinnamate, ethyl-o-methylcinnamate, propyl-o-methoxycinnamate, propyl-p-methoxycinnamate, ethyl-p-methoxycinnamate, methyl-p-ethoxycinnamate, methyl-β-methyl-p-methoxycinnamate, propyl-α-ethyl-p-methoxycinnamate, methyl-o-chlorocinnamate, ethyl-m-bromocinnamate, etc.

The following examples are given to illustrate the process of the present invention which, however, are not intended to limit the generally broad scope of the present invention in strict accordance therewith.

*Example I*

In this example active nickel peroxide which is used as the catalyst in the process of this invention is prepared by treating a stirred solution of 130 g. (0.5 mole) of nickel sulfate hexahydrate and 300 cc. of water with a solution of 42 g. (1.0 mole) of sodium hydroxide and 343 cc. of clorox during a period of one hour. Following this the resultant solution is stirred for an additional period of one hour at room temperature. The resultant nickel peroxide was filtered off and washed with water until the filtrate gave a negative chloride test. After drying the filtrate in a 90° C. oven for a period of eight hours there was obtained 50 g. of active nickel peroxide.

*Example II*

Into a condensation flask which was provided with stirring means was added 100 g. of active nickel peroxide. The catalyst was treated with a solution of 21.2 g. (0.16 mole) of cinnamic aldehyde and 128 g. (3.20 mole) of ethyl alcohol at such a rate so that the internal temperature of the reaction mixture did not exceed 45° C. During the addition of the solution the color of the catalyst changed from black to green. Upon completion of the addition of the solution, the flask and contents thereof were brought to reflux temperature (80° C.) for a period of one hour, after which said flask and said contents thereof were cooled to room temperature and filtered. The filtrate was subjected to fractional distillation to remove the excess ethyl alcohol and the residue analyzed by standard weight analysis techniques, said residue found to contain ethyl cinnamate.

*Example III*

In this example a solution of 21.2 g. (0.16 mole) of cinnamic aldehyde and 96 g. (3.0 mole) of methyl alcohol was added to a condensation flask containing 100 g. of active nickel peroxide catalyst at such a rate so that the internal temperature of the reaction mixture did not exceed 45° C. Upon completion of the addition of the solution the flask and contents thereof are brought to reflux temperature for a period of one hour, following which the flask and contents thereof are cooled to room temperature and filtered. The filtrate is subjected to distillation to remove the excess methyl alcohol and the residue is further distilled to recover the desired methyl cinnamate.

*Example IV*

In this example a solution of 24.3 g. (0.15 mole) of p-methoxycinnamic aldehyde and 96 g. (3.0 mole) of methyl alcohol is treated in a manner similar to that set forth in the above examples. Upon completion of the desired residence time and after return to room temperature, the solution is filtered, the excess methyl alcohol is removed and the desired product comprising methyl-p-methoxycinnamate is recovered.

*Example V*

A solution of 21.9 g. (0.15 mole) of o-methylcinnamic aldehyde and 138 g. (3.0 mole) of ethyl alcohol is treated in the presence of an active nickel peroxide catalyst in a manner similar to that hereinbefore set forth. Upon completion of the reaction, the desired product comprising ethyl-o-methylcinnamate is separated and recovered.

*Example VI*

In this example a solution of 27.1 g. (0.15 mole) of α-methyl-p-methoxycinnamic aldehyde and 180 g. (3.0 mole) of propyl alcohol is treated in the presence of a nickel peroxide catalyst. Upon completion of the reaction process, which is similar in nature to the process hereinbefore set forth, a desired product comprising propyl α-methyl-p-methoxycinnamate is separated and recovered.

I claim as my invention:

1. A process for the preparation of a cinnamate ester which comprises reacting a cinnamic aldehyde of the formula

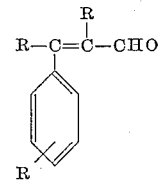

in which R is selected from the group consisting of hydrogen, alkyl, aryl, halo and alkoxy radicals, with an alkanol of 1 to 3 carbon atoms in the presence of a nickel peroxide catalyst, and recovering the desired ester.

2. A process for the preparation of a cinnamate ester which comprises reacting a cinnamic aldehyde of the formula

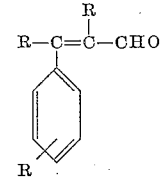

in which R is selected from the group consisting of hydrogen, alkyl, aryl, halo and alkoxy radicals, with an alkanol of 1 to 3 carbon atoms in the presence of a nickel peroxide catalyst at a temperature in the range of from about 25° C. to about 100° C., and recovering the desired ester.

3. A process for the preparation of a cinnamate ester which comprises reacting cinnamic aldehyde with an alkanol of 1 to 3 carbon atoms in the presence of a nickel peroxide catalyst at a temperature in the range of from about 25° C. to about 100° C., and recovering the desired cinnamate ester.

4. A process for the preparation of a cinnamate ester which comprises reacting p-methoxycinnamic aldehyde with an alkanol of 1 to 3 carbon atoms in the presence of a nickel peroxide catalyst at a temperature in the range of from about 25° C. to about 100° C., and recovering the desired cinnamate ester.

5. A process for the preparation of a cinnamate ester which comprises reacting o-methoxycinnamic aldehyde with an alkanol of 1 to 3 carbon atoms in the presence of a nickel peroxide catalyst at a temperature in the range of from about 25° C. to about 100° C., and recovering the desired cinnamate ester.

6. A process for the preparation of a cinnamate ester which comprises reacting p-ethoxycinnamic aldehyde with an alkanol of 1 to 3 carbon atoms in the presence of a nickel peroxide catalyst at a temperature in the range of from about 25° C. to about 100° C., and recovering the desired cinnamate ester.

7. A process for the preparation of a cinnamate ester which comprises reacting alpha-methyl-p-methoxycinnamic aldehyde with an alkanol of 1 to 3 carbon atoms in the presence of a nickel peroxide catalyst at a temperature in the range of from about 25° C. to about 100° C., and recovering the desired cinnamate ester.

8. A process for the preparation of a cinnamate ester which comprises reacting cinnamic aldehyde with propyl alcohol in the presence of a nickel peroxide catalyst at a temperature in the range of from about 25° C. to about 100° C., and recovering the desired cinnamate ester.

9. A process for the preparation of a cinnamate ester which comprises reacting cinnamic aldehyde with methyl alcohol in the presence of a nickel peroxide catalyst at a temperature in the range of from about 25° C. to about 100° C., and recovering the desired methyl cinnamate.

10. A process for the preparation of a cinnamate ester which comprises reacting cinnamic aldehyde with ethyl alcohol in the presence of a nickel peroxide catalyst at a temperature in the range of from about 25° C. to about 100° C., and recovering the desired ethyl cinnamate.

11. A process for the preparation of a cinnamate ester which comprises reacting p-methoxycinnamic aldehyde with methyl alcohol in the presence of a nickel peroxide catalyst at a temperature in the range of from about 25° C. to about 100° C., and recovering the desired methyl p-methoxycinnamate.

12. A process for the preparation of a cinnamate ester which comprises reacting o-methylcinnamic aldehyde with ethyl alcohol in the presence of a nickel peroxide catalyst at a temperature in the range of from about 25° C. to about 100° C., and recovering the desired ethyl o-methylcinnamate.

13. A process for the preparation of a cinnamate ester which comprises reacting alpha-methyl-p-methoxycinnamic aldehyde with propyl alcohol in the presence of a nickel peroxide catalyst at a temperature in the range of from about 25° C. to about 100° C., and recovering the desired propyl alpha-methyl-p-methoxycinnamate.

References Cited by the Examiner
UNITED STATES PATENTS

| | | | |
|---|---|---|---|
| 2,744,928 | 5/1956 | Smith et al. | 260—515 X |
| 3,027,400 | 3/1962 | McKinnis et al. | 260—475 |

LORRAINE A. WEINBERGER, *Primary Examiner.*

LEON ZITVER, *Examiner.*

R. E. MASSA, T. L. GALLOWAY, *Assistant Examiners.*